US008005917B2

(12) United States Patent
Cooper

(10) Patent No.: US 8,005,917 B2
(45) Date of Patent: Aug. 23, 2011

(54) CONSENSUS-BASED RELIABLE MESSAGING

(75) Inventor: Brian Frank Cooper, Palo Alto, CA (US)

(73) Assignee: Yahoo! Inc., Sunnyvale, CA (US)

( * ) Notice: Subject to any disclaimer, the term of this patent is extended or adjusted under 35 U.S.C. 154(b) by 195 days.

(21) Appl. No.: 12/242,018

(22) Filed: Sep. 30, 2008

(65) Prior Publication Data

US 2010/0082728 A1   Apr. 1, 2010

(51) Int. Cl.
*G06F 15/167* (2006.01)
(52) U.S. Cl. ........ 709/213; 709/201; 709/202; 709/205; 709/206; 709/208; 709/214; 709/215; 709/216; 709/223; 709/226
(58) Field of Classification Search .................. 709/202, 709/205, 206, 208, 213–216, 201, 223, 226
See application file for complete search history.

(56) References Cited

U.S. PATENT DOCUMENTS

| | | | | |
|---|---|---|---|---|
| 6,430,598 | B1* | 8/2002 | Dorrance et al. | 709/203 |
| 6,895,091 | B1* | 5/2005 | Elliott et al. | 380/278 |
| 7,519,669 | B2* | 4/2009 | Nikolov | 709/206 |
| 2004/0230982 | A1* | 11/2004 | Wookey | 718/106 |
| 2005/0064883 | A1* | 3/2005 | Heck et al. | 455/466 |
| 2008/0195633 | A1* | 8/2008 | Rose et al. | 707/100 |
| 2008/0301010 | A1* | 12/2008 | Klim et al. | 705/28 |
| 2009/0210277 | A1* | 8/2009 | Hardin et al. | 705/8 |
| 2010/0023587 | A1* | 1/2010 | Fletcher et al. | 709/206 |

OTHER PUBLICATIONS

Burrows, "The Chubby lock service for loosely-coupled distributed systems", OSDI'06: Seventh Symposium on Operating System Design and Implementation, Seattle, WA, Nov. 2006, 16 pgs.

TIBCO, "Enterprise Message Service"; http://www.tibco.com/products/soa/messaging/enterprise-message-service/default.jsp (2 pages).
TIBCO, "Advances Service Oriented Architecture (SOA) with Closer Microsoft Integration", 2008 Press Release (1 page).
Oracle, "Understanding WebLogic JMS"; http://download.oracle.com/docs/cd/E12840_01/wls/dops103/jms/fund.html (16 pages).
Wikipedia, "Apache ActiveMQ", 2011 (2 pages).
Eisenhauer, Greg, The ECho Event Delivery System, Georgia Institute of Technology, Atlanta, CA Jul. 18, 2002 (19 pages).
freebXML, "Project: Hermes Message Service Handler", freebxml. org (1 page).
JBoss, Inc. "Getting Started With JBoss 4.0" Release 4, 2004, 2005 (3 pages).
Huang, Jie et al. "Infopipes-an Abstraction for Information Flow" Oregon Graduate Institute (6 pages).
USGS, "Overview of ISIS Architecture" ISIS 2 Documentation (36 pages).
IBM "WebSphere MQ V6 Fundamentals" ibm.com/redbooks (446 pages).
Sturman, Daniel et al. "Reflection in the Gryphon Message Brokering System" IBM TJ Watson Research Center, Hawthorne, NY (5 pages).

* cited by examiner

*Primary Examiner* — Liangche A. Wang
(74) *Attorney, Agent, or Firm* — Weaver Austin Villeneuve & Sampson LLP

(57) ABSTRACT

A system includes a leader server capable of communicating with a plurality of follower servers and a network. The leader server is configured to determine when a message received from a client connected to the network has been committed to main memory in a majority of the leader and follower servers. The leader server and each of the follower servers that committed the message to main memory retain the message in main memory until requested to remove the message from main memory by a delivery agent or an archiver.

23 Claims, 3 Drawing Sheets

CONSENSUS-BASED RELIABLE MESSAGING

FIELD OF DISCLOSURE

The disclosed system and method relate to messaging in a network. More specifically, the disclosed system and method relate to consensus-based messaging in a network.

BACKGROUND

In a publish/subscribe system, senders of messages (publishers) are characterized into classes without the knowledge of how many, if any, receivers (subscribers) there may be. Subscribers express interest in one or more classes of messages without knowing how many publishers there are. The subscribers will only receive messages that are of interest to them.

In conventional publish/subscribe systems, a publisher connected to subscribers through an intermediary or "broker". In these systems, publishers post messages to the broker and subscribers register subscriptions with the broker. The broker receives messages from the publishers, filters the messages to identify the topic or content, and then forwards the messages to interested subscribers.

In a typical system, messages were required to be delivered to all live subscribers in the order in which the messages were published. The requirement for messages to be delivered in order was to be maintained even despite failures in the system. To protect against failures, some conventional systems employ network attached storage that internally replicate the messages using a redundant array of inexpensive disks (RAID) system or other complex data replication techniques. These conventional systems are big, expensive, and are difficult to setup.

An improved messaging system is desirable.

SUMMARY

In one embodiment, a system includes a leader server capable of communicating with a plurality of follower servers and a network. The leader server is configured to determine when a message received from a client connected to the network has been committed to main memory in a majority of the leader and follower servers. The leader server and each of the follower servers that committed the message to main memory retain the message in main memory until requested to remove the message from main memory by a delivery agent or an archiver.

In some embodiments, a method comprises requesting a plurality of follower servers to commit a message to main memory, determining that the message has been published when a majority of the leader and follower servers have committed the message to main memory, and maintaining the message in a main memory until receiving a signal from a delivery agent or an archiver to remove the message from the main memory.

In some embodiments, a machine readable storage medium is encoded program code. When the program code is executed by a processor, the processor performs a method comprising requesting a plurality of follower servers to commit a message to main memory, determining that the message has been published when a majority of the leader and follower servers have committed the message to main memory, and maintaining the message in a main memory until receiving a signal from a delivery agent or an archiver to remove the message from the main memory.

A processor in a multi-processor system receives a message from a client. Each respective processor of the system is coupled to a respective main memory. Multiple processor main memories store copies of the message. As a copy of the message is archived from a main memory, the copy of the message stored in that archiving storage is removed from such memory. A data structure is produced that keeps track of the current memory locations of copies of the messages in main memory and archive storage. The message is delivered to a multiplicity of subscribers. Upon completion of delivery of the message to the multiplicity of subscribers, the copies of the message are removed from memory and storage locations that currently store the message. The data structure is referenced in the course of such latter removal to determine the memory and storage locations that currently contain the message.

Thus, the message is stored in multiple memory locations to provide redundancy in case of failure of one or more processors or other system components. The messages are stored initially in multiple main memories. As copies of the message are archived, a data structure is created and is modified to keep track of main memory locations and archive storage locations that currently contain copies of the message. Thus, redundancy is achieved through storage of copies of the message in a combination of the main memory locations and archive storage locations. After the message has been delivered over the network to subscribers, copies of the message are removed from current memory and storage locations indicated by the data structure.

Moreover, in some embodiments, the data structure is accessible to a delivery agent. The delivery agent accesses the data structure in the course of removal of the message following completion of delivery to the multiplicity of subscribers. Therefore the delivery agent can effect timely removal of messages that have been stored redundantly but that are no longer required to be stored.

DETAILED DESCRIPTION

Figure 1:
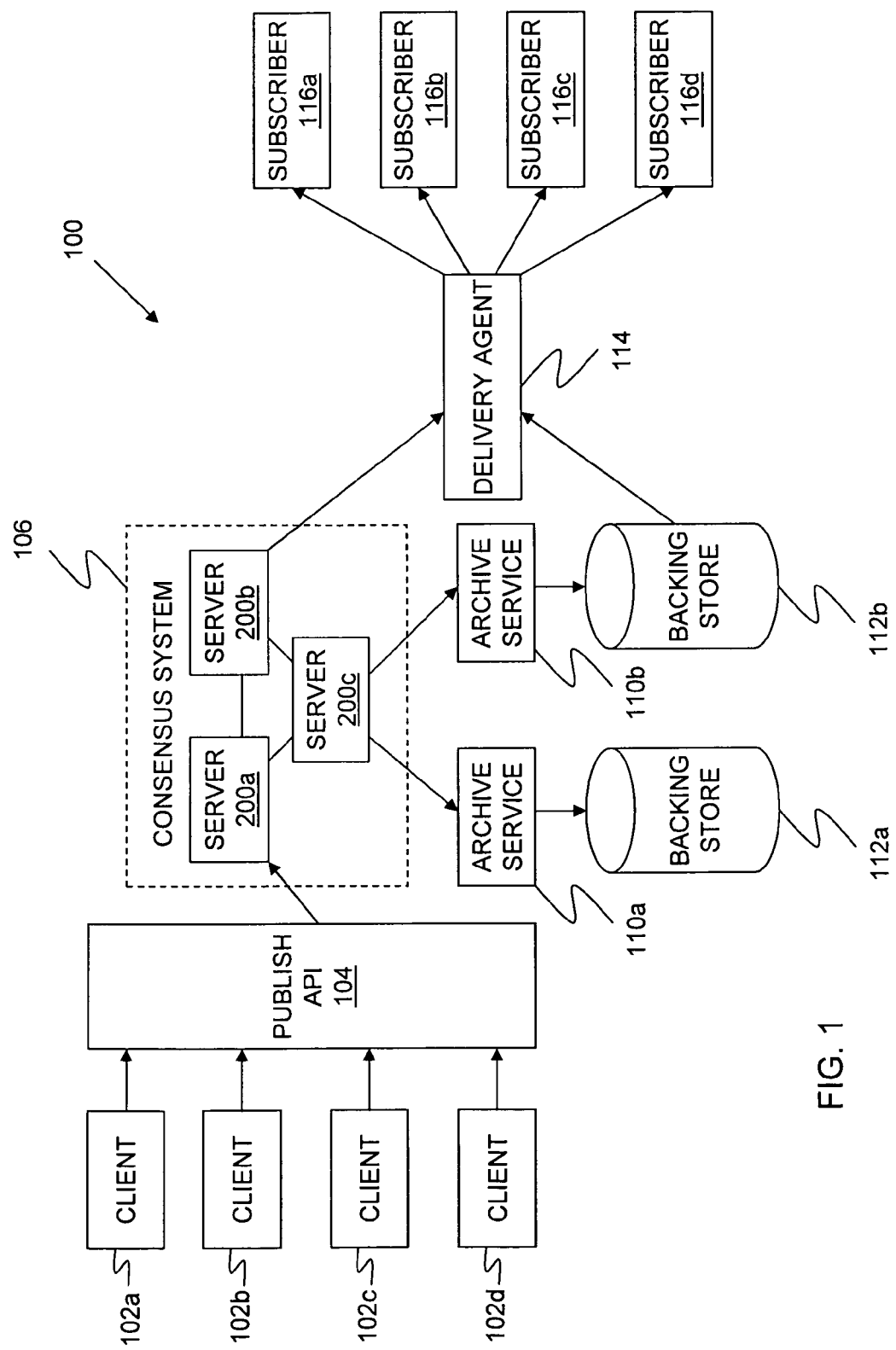
FIG. 1 is a block diagram of one example a publish/subscribe messaging system.

An improved publish/subscribe system and method are now described. FIG. 1 illustrates one example of a topology of a publish/subscribe system 100. As shown in FIG. 1, system 100 includes clients 102a, 102b, 102c, and 102d that communicate with consensus system 106 through an application programming interface (API) 104. Consensus system 106 is connected to backing stores 112a, 112b through archiving services 110a, 110b. Consensus system 106 communicates with subscribers 116a, 116b, 116c, and 116d through a delivery agent 114.

Clients 102a-102d and subscribers 116a-116d may be computers, servers, mobile phones, personal digital assistants (PDAs), or other devices that electronically transmit messages. Although only four clients 102a-102d and subscribers 116a-116d are shown in FIG. 1, more or fewer clients 102 and subscribers 116 may be implemented. Clients 102a-102d and subscribers 116a-116d may be connected to consensus service 106 through a local area network (LAN), wide area network (WAN), or the Internet.

Publish API 104 may be any API including, but not limited to, Windows API, Java API, and the like. In one embodiment, the publish API 104 is implemented through the Tomcat servlet engine available from the Apache Software Foundation. Clients 102a-102d publish messages to the consensus system 106 through the publish API 104.

In one embodiment, the consensus system 106 is the ZooKeeper service available from Yahoo! Inc., of Sunnyvale, Calif. However, other consensus services including, but not limited to, Chubby Distributed Lock Service available from Google, Inc. of Mountain View, Calif. As shown in FIG. 1, consensus system 106 includes a plurality of severs 200a, 200b, and 200c. Note that although three servers 200a-200c are shown in FIG. 1, fewer or more servers 200 may be implemented. However, the more servers included in consensus system 106 the more fault-tolerant the messaging system will be as described below.

Figure 2:
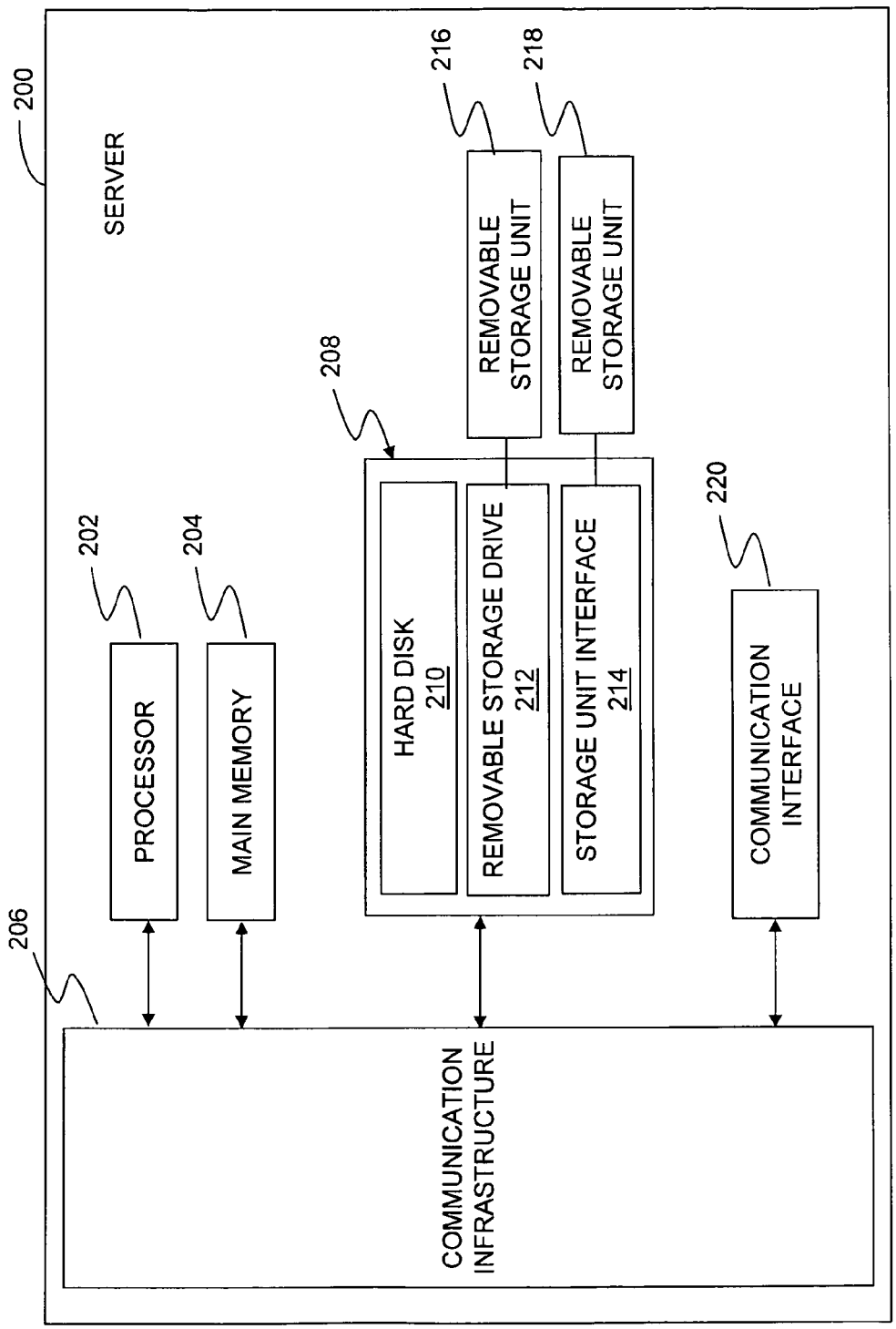
FIG. 2 is a block diagram of one example of a server architecture in accordance with FIG. 1.

An example architecture of a server 200 is illustrated in FIG. 2. As shown in FIG. 2, server 200 may include one or more processors 202, which may be connected to a wired or wireless communication infrastructure 206 (e.g., a communications bus, cross-over bar, local area network (LAN), or wide area network (WAN)). Server 200 may include a main memory 204, e.g., a local or working memory, such as a random access memory (RAM). Server 200 may also include a secondary memory 208 such as, for example, a hard disk drive 210 and/or removable storage drive 212, representing a floppy disk drive, a magnetic tape drive, an optical disk drive, or the like. Secondary memory 208 is a more persistent memory than main memory 204 and may be used to archive messages or data. The removable storage drive 212 may read from and/or write to a removable storage unit 216. Removable storage unit 216 may be a floppy disk, magnetic tape, CD-ROM, DVD-ROM, optical disk, ZIP™ disk, or the like, which may written to and/or read by removable storage drive 212. Removable storage unit 216 may include a machine readable storage medium having stored therein computer software and/or data.

In some embodiments, secondary memory 208 may include other similar devices for allowing computer programs or other instructions to be loaded into server 200 such as a removable storage unit 218 and an interface 214. An example of such a device 218 and socket 214 includes, but is not limited to, a USB flash drive and associated USB port, respectively. Other removable storage units 218 and interfaces 214 that allow software and data to be transferred from the removable storage unit 218 to server 200 may be used, such as SIM cards or MP3 players.

Server 200 may also include a communications interface 220. Communications interface 220 allows software and data to be transferred between server 200 and external devices, such as clients 102a-102d and subscriber 116a-116d, shown in FIG. 1. Examples of communications interface 220 may include a modem, a network interface (such as an Ethernet card), a communications port, a Personal Computer Memory Card International Association (PCMCIA) slot and card, an IEEE 1394 port or the like. Software and data transferred via communications interface 220 are in the form of signals, which may be electronic, electromagnetic, optical, or any other signal capable of being received by communications interface 220. These signals are provided to communications interface 220 via a communications path or channel. The path or channel that carries the signals may be implemented using wire or cable, fiber optics, a telephone line, a cellular link, a radio frequency (RF) link, and the like.

Each of the servers 200a-200c is in communication with the other servers 200a-200c of the consensus system 106. Servers 200a-200c may be connected via a wired or wireless connection. At startup, the servers 200a-200c will elect a "leader", e.g., server 200c, of the consensus system 106. The remaining servers, e.g., servers 200a, 200b, are known as "follower" servers. Note that the leader server may change should a fault to the leader server occur or a transmission connection between the leader server 200c and follower servers 200a, 200b be disrupted. Each of the servers 200a-200c may maintain a data structure in main memory 204 or secondary memory 208 that identifies the current leader server. In some embodiments, the servers 200a-200c comprising consensus system 106 service the clients 102a-102d by establishing connections using a connection oriented protocol, such as transmission control protocol (TCP) with clients 102a-102d. In other embodiments, other control protocols including, but not limited to, connectionless protocols such as real time transfer protocol (RTP) and user datagram protocol (UDP) may be used to communicate with clients 102.

Consensus system 106 may use a Paxos algorithm or like protocol to determine whether a message has been published, e.g., the message has been received by the consensus system 106. For example, a follower server 200a may establish a connection with client 102b, which may then send a message to follower server 200a. Examples of messages may include, but are not limited to, sports scores, news updates, stock market update, and like messages that may be communicated from a publisher to a plurality of subscribers. Upon receipt of the message from client 102b, follower server 200a forwards the message to leader server 200c, which then forwards the message to each of the servers of the consensus system 106 asking them to commit the message to memory. When a follower server 200a, 200b commits the message to main memory 204, it sends a message to leader server 200c identifying that the message has been committed to memory. When leader server 200c determines that a majority of the follower servers 200a, 200b have persisted a change/update, the leader server 206c will log the change/update as having been persisted and transmit a message to the follower server 200a that received the message from client 102b. In some embodiments, the leader server may determine that the message has been published when a predetermined number of servers 200a-200c, which may be less than a majority, acknowledge that the message has been stored in memory. The predetermined number of servers may be selected to ensure an adequate redundancy of the message has been stored. The message from leader server 200c to follower server 200a instructs follower server 200a to inform client 102b that the message has been published. It is in this manner that consensus system 106 decides in a fault-tolerant manner whether a message has been published.

Each of the servers 200a-200c may store data, such as copies of the received messages and metadata about the messages, in a plurality of data registers (not shown) as data structures. Additionally, each server 200a-200c may maintain a data tree image and transaction logs in main memory 204. By maintaining the data in main memory 204, consensus system 106 provides a high throughput and low latency of messages compared to conventional systems which store messages to hard disks. Each data structure may include version numbers for data changes, access control list (ACL) changes, and timestamps, to allow cache revalidations and coordination updates enabling consensus system 106 to maintain the messages received from clients in a consistent order.

Each server 200*a*-200*c* maintains current versions of the data structure by communicating an update to the leader server, which then advises the follower servers of the update to the data structure. In some embodiments, the manner in which an update to a data structure is performed is the same manner a message is published. For example, the leader server 200*c* may receive an update to a data structure which it distributes to each of the follower servers 200*a*, 200*b* which then signal the leader server 200*c* when the data structure has been updated. The leader server 200*c* may identify a data structure as having been updated when all, a majority, or some predetermined number of the servers 200*a*-200*c* acknowledge that the data structure has been updated.

In some embodiments, each of the messages received by the consensus system 106 are stored as a data structure underneath a topic data structure. For example, a topic "FOO" may have its own data structure, which may include an additional data structure for each message for the topic as illustrated below:

Topic FOO
   Messages
      Msg-1 (payload)
      Msg-2 (payload)
      Msg-3 (payload)

Referring again to FIG. 1, archiving services 110*a*, 110*b* are configured to archive older messages stored on main memory 204 of servers 200*a*-200*c* to backing stores 112*a*, 112*b*. Note that although two archiving processes 110*a*, 110*b* are shown, fewer or more archiving processes may be implemented. In some embodiments, the archiving processes 110*a*, 110*b* are configured to run on the same servers or a subset of the servers as the consensus system 106. For example, a server may have two hard disk drives in a RAID configuration. In some embodiments, the archiving processes 110*a*, 110*b* run on servers or machines that are separate from the servers 200*a*-200*c* of the consensus system 106.

Because messages received by the consensus system 106 are stored in the main memory 204 of servers 200*a*-200*c*, these messages must be archived to free up space on main memory 204 to ensure that these messages are available to be delivered to slow subscribers. The result is that messages are always stored on multiple nodes, either multiple consensus servers 200*a*-200*c*, multiple archive nodes such as backing stores 112*a*, 112*b* (possibly both), or on some combination of backing stores 112 and servers 200 of consensus system 106. Storing the messages on multiple nodes ensures high reliability and fault tolerance. Additionally, increasing the number of archiving processes 110 increases the redundancy of the archived messages enabling the system 100 to tolerate more failures without losing messages.

Backing stores 112*a*, 112*b* are databases configured to store the messages archived from the consensus system 106. In one embodiment, backing stores 112*a*, 112*b* are configured with a relational database management system (RDBMS). Examples of an RDBMS include, but are not limited to, MySQL (owned by My SQL AB of Sweden) and PostgreSQL (developed by PostgreSQL Global, and available from http://www.postgresql.org). In some embodiments, backing stores 112*a*, 112*b* may be a file system. Example file systems include, but are not limited to, Unix file systems, Windows file systems, and the like. Each backing store 112*a*, 112*b* may asynchronously read through the sequence of messages and write them to a local log stored in backing stores 112. In some embodiments, the local log may be managed as a MySQL table using group commit for throughput.

When the message is successfully archived in a backing store 112*a*, 112*b*, a flag may be written into the message in the data structure stored in consensus system 106. For example, assume that backing store 112*a*, denoted as 'A', and backing store 112*b*, denoted as 'B', are each assigned to archive the Topic FOO. The data structure stored in the consensus system 106 may be as follows:

Topic FOO
   Messages
      Msg-1 (payload, A, B)
      Msg-2 (payload, B)
      Msg-3 (payload)

In the example shown above, Msg-1 is archived in backing stores 112*a* (A) and 112*b* (B), Msg-2 is archived in backing store 112*b* (B), and Msg-3 is not archived and thus remains stored in the main memory 204 of multiple servers 200*a*-200*c* of consensus system 106. If a message is archived in multiple backing stores, such as Msg-1, then it may be removed from the consensus system 106. For example, if archiving service 110*b* archives Msg-1 to backing store 112*b*, it will update the metadata of Msg-1 stored in consensus system 106. If archiving service 110*b* determines that archiving service 110*a* has already archived a copy of the message to backing store 112*a* while it is updating the metadata, then archiving service 110*b* may send a message to consensus system 106 to remove the message from main memory 204. The hierarchy in the consensus system 106 may then be represented as follows:

Topic FOO
   Messages
      Msg-2 (payload, B)
      Msg-3 (payload)

At this point, Msg-1 is guaranteed to be in both backing stores 112*a*, 112*b* unless there is a failure to either of the backing stores 112*a*, 112*b*. Metadata about a topic, such as the desired redundancy level, can also be stored in the topic data structure. The identities of the backing stores 112*a*, 112*b* can be stored as a set of ephemeral data structures under the topic data structure so that the failure of a backing store 112*a*, 112*b* can be detected and another backing store can be started to replace the failed backing store 112. Thus, the schema for topic FOO will be:

Topic FOO
   Archivers
      Backing store A (112*a*)
      Backing store B (112*b*)
   Messages
      Msg-1 (payload, A, B)
      Msg-2 (payload, B)
      Msg-3 (payload)

Delivery agent 114 is configured to read messages from the consensus system 106 and backing stores 112*a*, 112*b* and deliver them to one or more of the subscribers 116*a*, 116*b*, 116*c*, and 116*d*. In some embodiments, there is only one active delivery agent 114. In some embodiments, there may be multiple delivery agents 114. However, if multiple delivery agents 114 are implemented, multiple delivery agents 114 should not be assigned to the same topic or topics. If a delivery agent 114 for a topic starts, and another delivery agent is already active for the topic in the consensus system 106, then the new agent should be terminated.

The delivery agent 114 may be a form of code stored in a computer readable storage medium on one or more of the servers 200*a*-200*c* of the consensus system 106 or on another server, computer, or machine that is separate from consensus system 106. If delivery agent 114 is stored on a separate machine, it may gain access to the consensus system 106 by establishing a connection in the same manner in which a client 102*a*-102*d* connects to consensus system 106. For example, delivery agent 114 may use a TCP connection through the consensus system API 104. Once the connection is established, delivery agent 114 may request a read or write of data to or from a server 200a-200c of the consensus system 106. In this manner, delivery agent 114 may maintain access to a data structure stored in consensus system 106.

The consensus system 106 may be configured to store metadata about the delivery agent 114. For example, the top level schema in the consensus system 106 may be as follows:
Consensus System
    Delivery Agent
        Agent 114
        Topics
            FOO
                Archivers
                    Backing store A (112a)
                    Backing store B (112b)
                Messages
                    Msg-1 (payload, A, B)
                    Msg-2 (payload, B)
                    Msg-3 (payload)
            GOO
                Archivers
                Messages For each of the subscribers 116a-116d, the delivery agent 114 maintains a copy of a delivery pointer (not shown) and a copy of a consume pointer (not shown). The delivery and consume pointers may be a main memory 204 or a secondary memory 208 of one or all of the servers 200a-200c, or in the server, computer, or machine in which the delivery agent 114 is stored. In some embodiments, the delivery agent 114 maintains a hash table that identifies all subscribers and lists each of the messages that each of the subscriber has acknowledged receiving. The hash table may be archived to a backing store 112a, 112b. The delivery pointer identifies the next message that the delivery agent 114 is to deliver to subscribers 116a-116d, and the consumer pointer identifies the last message that was acknowledged by a subscriber 116a-116d for a particular topic. In some embodiments, the consume pointer can be stored in the MySQL database and be replicated using lazy MySQL replication.

Delivery agent 114 reads the messages from either the consensus system 106 or the backing stores 112a, 112b and sends the messages to each of the subscribers 116a-116d. In some embodiments, a server 200a-200b may output a message stored in main memory 204 at which point the delivery agent 114 directs the message to the appropriate subscribers. If a message has been archived, then a backing store 112a, 112b may output the message from a secondary memory 208 to main memory 204 where it is then output for delivery by delivery agent 114, which directs the message to the appropriate subscribers. After a subscriber 116a-116d receives the message, it will send an acknowledgment or consume message to delivery agent 114 at which point delivery agent 114 will update the consume pointer for the client. When the consume pointer for all of the clients for a topic identify that a message has been consumed or acknowledged as having been received by all subscribers for a topic, then the delivery agent 114 may send a message requesting that the message be removed from the backing stores 112, the consensus system 106, or both. In some embodiments, the delivery agent requests the message be removed from the consensus system 106 and the backing stores 112. To remove the message from consensus system 106, delivery agent may send a message to one or more of the servers 200a-200c of the consensus system. For example, delivery agent 114 may send a message to remove the message from memory to the leader server 200c, which will then direct the follower servers to remover the message. In some embodiments, delivery agent 114 may send a message to a follower server 200a, 200b, which forwards the message to leader server 200c, which directs each of the servers 200a-200c of the consensus system 106 to remove the message from memory. To remove the message from a backing store 112, delivery agent 114 may send a message to each of the archivers 110a, 110a requesting each to remove the message from secondary storage 208.

Figure 3:
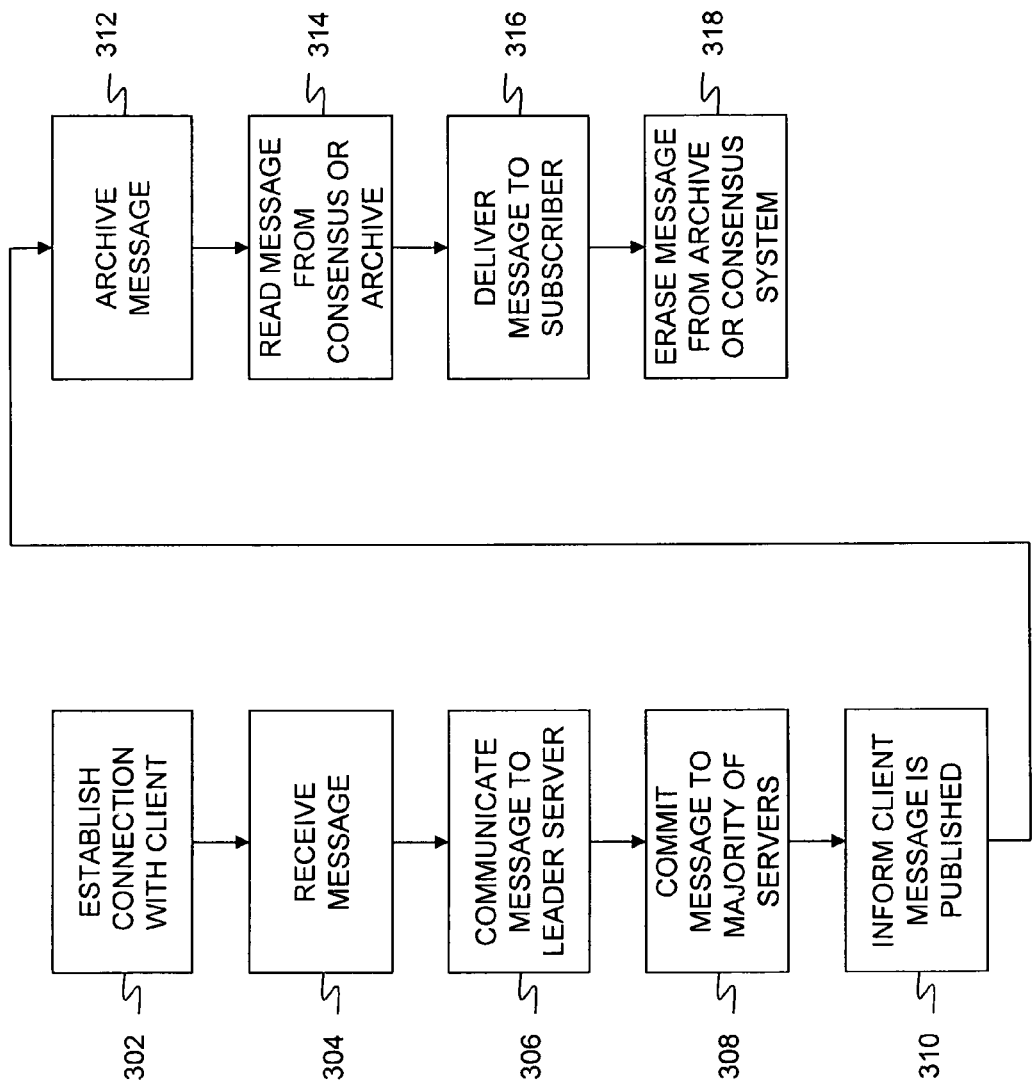
FIG. 3 is a flow diagram of a method of consensus-based messaging in accordance with the system illustrated in FIG. 1.

With reference to FIG. 3, an improved method of consensus-based, fault-tolerant messaging is now described. At block 302, a connection between a client 102a-102d and the consensus system 106 is established. As described above, the connection may be a TCP connection between one or more of the clients 102a-102d and a server 200a-200c of consensus system 106.

At block 304 the consensus system 106 receives a topic-based (or content-based) message from a client 102a-102d through the publish API 104. The server 200a-200c that receives the message from the client 102a-102d forwards the message to the leader server 200c at block 306. Leader server 200c forwards the received message to each of the follower servers 200a, 200b asking each to commit the message to memory.

Each of the servers 200a-200c will store the received message in main memory 204 and report to the leader server 200c when the message has been stored. At block 308, the leader server 200c receives message from a majority of the follower servers 200a, 200b that the message has been successfully stored in main memory 204. When the majority of the follower servers 200a, 200b report that the message has been stored, leader server 200c instructs the server 200a, 200b in communication with the client 102a-102d to inform the client 102a-102d that the message has been published at block 310.

At block 312, the messages stored in servers 200a-200c of consensus system 106 are archived to backing stores 112a, 112b by the archiving services 110a, 110b. As described above, each backing store 112a, 112b may asynchronously read through the sequence of messages and write them to a local log. When the message is successfully archived, a flag may be written into the message in the data structure.

At block 314, the delivery agent 114 reads the stored messages from either the consensus system 106 or from one or more of the backing stores 112a, 112b. For example, delivery agent 114 may first check to see if the message is stored in consensus system 106. If the message is still stored in consensus system 106, then the delivery agent 114 will read the message from a main memory 204 of one or more of the servers 200a-200c of the consensus system 106. Alternatively, if the message is no longer stored in the consensus system 106, then it will be stored in at least one of the backing stored 112a, 112b, so the delivery agent 114 may read the message from backing store 112a or backing store 112b.

At block 316, delivery agent 114 delivers the message to one or more subscribers 116a-116d. Subscribers 116a-116d may send an acknowledgment or consume message back to delivery agent 114 in response to receiving the message. Once the delivery agent 114 receives the message, it may send a message to the consensus system 106 and/or archivers 110a, 110b identifying that the message has been delivered. The consensus system 106 and backing stores 112a, 112b may delete the message from memory when they receive a signal that the message has been received by the one or more subscribers 116a-116d.

In addition to the above described embodiments, the disclosed method and system may be embodied in the form of computer-implemented processes and apparatus for practicing those processes. The present disclosed method and apparatus may also be embodied in the form of computer program code embodied in tangible storage media, such as floppy diskettes, read only memories (ROMs), CD-ROMs, hard drives, "ZIP™" high density disk drives, DVD-ROMs, flash memory drives, or any other computer-readable storage medium, wherein, when the computer program code is loaded into and executed by a computer, the computer becomes an apparatus for practicing the disclosed method and system. The present disclosed method and apparatus may also be embodied in the form of computer program code, for example, whether stored in a storage medium, loaded into and/or executed by a computer, wherein, when the computer program code is loaded into and executed by a computer, the computer becomes a special-purpose apparatus for practicing the disclosed method. When implemented on a general-purpose processor, the computer program code segments configure the processor to create specific logic circuits.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A system, comprising:
a first server connected to a plurality of follower servers and a network, the first server and each of the plurality of follower servers having a respective one of a plurality of main memories, the first server configured to determine when a message received from a client connected to the network has been committed to the respective one of the plurality of main memories in a predetermined number of the plurality of follower servers, wherein the first server and each of the plurality of follower servers that committed the message to the respective one of the plurality of main memories retain the message in the respective one of the plurality of main memories until requested to remove the message from the respective one of the plurality of main memories by a delivery agent or an archiver;
wherein the first server and each of the plurality of follower servers is configured to maintain a data structure in a respective one of the plurality of main memories, the data structure indicative of each one of the plurality of main memories that currently stores the message.

2. The system of claim 1, wherein the delivery agent requests the first server and each of the follower servers remove the message from the respective one of the plurality of main memories once a subscriber designated to receive the message acknowledges receipt of the message.

3. The system of claim 1, wherein the archiver requests the first server and each of the follower servers remove the message from the respective one of the plurality of main memories once the message has been stored by the archiver in an archive database.

4. The system of claim 3, wherein the delivery agent is configured to forward the message to a subscriber connected to the network by reading the message from the respective one of the plurality of main memories of any of the first server and each of the follower servers or from the archive database.

5. The system of claim 3, wherein a plurality of archivers are in communication with the first server, each of the plurality of archivers configured to store the message in a database associated with each of the plurality of archivers.

6. The method of claim 1, wherein the first server is configured to notify the plurality of follower servers of any updates to the data structure in the one of the plurality of main memories of the first server.

7. A method, comprising:
requesting by a first server that each of a plurality of follower servers commit a message to a respective one of a plurality of main memories;
determining by the first server that the message has been published when a predetermined number of the plurality of follower servers have committed the message to the respective one of the plurality of main memories of the predetermined number of the plurality of follower servers;
maintaining by the first server the message in a main memory of the first server until receiving a signal from a delivery agent or an archiver to remove the message from the main memory of the first server; and
maintaining a data structure by the first server in the main memory of the first server, the data structure identifying the servers in which the message is stored.

8. The method of claim 7, further comprising:
receiving a signal by the first server from the delivery agent to remove the message from the main memory when a subscriber designated to receive the message acknowledges receipt of the message; and
updating the data structure in the main memory of the first server by the first server to indicate that the message is no longer stored in the main memory of the first server.

9. The method of claim 7, further comprising:
receiving a signal by the first server from the archiver to remove the message from the main memory when the message has been stored by the archiver in an archive database; and
updating the data structure in the main memory of the first server by the first server to indicate that the message is no longer stored in the main memory of the first server.

10. The method of claim 7, further comprising:
updating the data structure in the main memory of the first server by the first server in response to the message being stored by the archiver.

11. The method of claim 7, further comprising:
updating the data structure in response to the message being removed from the main memory of the first server after having been delivered to a subscriber.

12. The method of claim 7, wherein each of the plurality of follower servers that committed the message to the respective one of the plurality of main memories maintain the message until receiving a signal to remove the message from the respective one of the plurality of main memories, the signal being received from a delivery agent upon delivery of the message to one or more subscribers or an archiver upon archiving of the message.

13. The method of claim 7, further comprising:
requesting by the first server that the plurality of follower servers that committed the message to the respective one of the plurality of main memories remove the message from the respective one of the plurality of main memories.

14. A non-transitory machine readable storage medium encoded program code, wherein when the program code is executed by a processor, the processor performs a method comprising:
requesting by a first server that each of a plurality of follower servers commit a message to a respective one of a plurality of main memories;

determining by the first server that the message has been published when a predetermined number of the plurality of follower servers have each committed the message to the respective one of the plurality of main memories;

maintaining by the first server the message in main memory of the first server until receiving a signal to remove the message from the main memory of the first server, the signal being received from a delivery agent or an archiver; and maintaining by the first server a data structure in the main memory of the first server, the data structure identifying the servers in which the message is stored.

15. The non-transitory machine readable storage medium of claim 14, further comprising:

receiving by the first server a signal to remove the message from the main memory of the first server from the delivery agent when at least one subscriber designated to receive the message acknowledges receipt of the message;

removing the message from the main memory of the first server in response to the signal received from the delivery agent; and updating the data structure in response to the message being removed from the main memory of the first server.

16. The non-transitory machine readable storage medium of claim 15, wherein each of the plurality of follower servers is configured to maintain a data structure in a respective one of the plurality of main memories, the data structure indicative of each one of the plurality of main memories that currently stores the message, the method further comprising:

notifying each of the plurality of follower servers to update the data structure in the respective one of the plurality of main memories to indicate that message is no longer stored in the main memory of the first server.

17. The non-transitory machine readable storage medium of claim 14, further comprising:

receiving a signal by the first server from the archiver to remove the message from the main memory of the first server when the message has been stored in at least one archive database by the archiver;

removing the message from the main memory of the first server in response to the signal received from the archiver; and updating the data structure in response to the message being removed from the main memory of the first server.

18. The non-transitory machine readable storage medium of claim 17, wherein each of the plurality of follower servers is configured to maintain a data structure in a respective one of the plurality of main memories, the data structure indicative of each one of the plurality of main memories that currently stores the message, the method further comprising:

notifying each of the plurality of follower servers to update the data structure in the respective one of the plurality of main memories to indicate that message is no longer stored in the main memory of the first server.

19. The non-transitory machine readable storage medium of claim 14, wherein each of the plurality of follower servers that committed the message to the respective one of the plurality of main memories maintain the message until receiving a signal from a delivery agent or an archiver to remove the message from the respective one of the plurality of main memories.

20. The non-transitory machine readable storage medium of claim 14, wherein each of the plurality of follower servers is configured to maintain a data structure in a respective one of the plurality of main memories, the data structure indicative of each one of the plurality of main memories that currently stores the message, the method further comprising:

notifying each of the plurality of follower servers to update the data structure in the respective one of the plurality of main memories in response to a modification to the data structure in the main memory of the first server.

21. The non-transitory machine readable storage medium of claim 14, wherein each of the plurality of follower servers is configured to maintain a data structure in a respective one of the plurality of main memories, the data structure indicative of each one of the plurality of main memories that currently stores the message, the method further comprising:

receiving an update to the data structure of one of the plurality of main memories of one of the plurality of follower servers; and in response to receiving the update, modifying the data structure in the main memory of the first server in accordance with the update and notifying other ones of the plurality of follower servers to modify the data structure in the respective one of the plurality of main memories in accordance with the update.

22. In a system that includes a plurality of respective processors each associated with a respective main memory and at least one or more archive storages and a network interface, a method comprising:

receiving a first message by at least one of the plurality of processors from a client over the network;

storing respective copies of the first message in the respective main memories associated with a selected number of the processors;

archiving at least one respective copy of the first message from at least one of the respective main memories in at least one archive storage;

removing the at least one respective copy of the first message from each of the at least one respective main memory from which a copy of the first message has been archived;

in the course of archiving, producing in each respective main memory a data structure indicative of each respective main memory and each at least one archive storage that currently stores the first message;

outputting the first message for delivery over the network to each of a multiplicity of subscribers;

removing the first message from each respective main memory and each at least one archive storage that currently contains the first message after delivery of the message to the multiplicity of subscribers; and in the course of removing the first message after delivery of the message to the multiplicity of subscribers, referring to the data structure to determine each respective main memory and each at least one archive storage that currently contains the first message.

23. The method of claim 22 further comprising:

receiving an indication from a delivery agent that the first message has been delivered to the multiplicity of subscribers;

wherein removing the first message after delivery of the message to the multiplicity of subscribers is responsive to the received indication.

* * * * *